(12) United States Patent
Kempshall

(10) Patent No.: US 11,454,245 B1
(45) Date of Patent: Sep. 27, 2022

(54) CONVERTIBLE DUCTED FAN ENGINE

(71) Applicant: Hyalta Aeronautics, Inc., St. Petersburg, FL (US)

(72) Inventor: Scott R. Kempshall, St. Petersburg, FL (US)

(73) Assignee: Hyalta Aeronautics, Inc., St. Petersburg, FL (US)

( * ) Notice: Subject to any disclaimer, the term of this patent is extended or adjusted under 35 U.S.C. 154(b) by 804 days.

(21) Appl. No.: 16/414,448

(22) Filed: May 16, 2019

Related U.S. Application Data

(63) Continuation-in-part of application No. 16/225,951, filed on Dec. 19, 2018, now Pat. No. 11,333,032, which is a continuation-in-part of application No. 15/209,383, filed on Jul. 13, 2016, now Pat. No. 10,180,083.

(51) Int. Cl.
| | |
|---|---|
| *F04D 29/052* | (2006.01) |
| *F04D 19/00* | (2006.01) |
| *F04D 29/32* | (2006.01) |
| *F04D 29/52* | (2006.01) |
| *B60F 5/00* | (2006.01) |
| *B60F 3/00* | (2006.01) |

(52) U.S. Cl.
CPC ......... *F04D 29/052* (2013.01); *F04D 19/002* (2013.01); *F04D 29/325* (2013.01); *F04D 29/526* (2013.01); *B60F 3/0007* (2013.01); *B60F 5/00* (2013.01); *F05B 2240/14* (2013.01)

(58) Field of Classification Search
CPC .... F04D 29/052; F04D 29/325; F04D 29/526; F04D 19/002; F05B 2240/14; B64C 29/001; B60F 5/02; B60B 19/00
See application file for complete search history.

(56) References Cited

U.S. PATENT DOCUMENTS

2020/0172234 A1 * 6/2020 Neff ............... B64C 29/0033

FOREIGN PATENT DOCUMENTS

| CN | 104369635 A | * | 2/2015 |
| CN | 204488372 U | * | 7/2015 |
| CN | 204506376 U | * | 7/2015 |
| CN | 107719049 A | * | 2/2018 |

OTHER PUBLICATIONS

CN-204506376—(Zhao et al.; Jul 29, 2015) English Translation (Year: 2022).*

(Continued)

*Primary Examiner* — Topaz L. Elliott
*Assistant Examiner* — Aye S Htay
(74) *Attorney, Agent, or Firm* — Nicholas Pfeifer; Smith & Hopen, P. A.

(57) ABSTRACT

A convertible ducted fan engine having a shroud, a drive shaft connected to a mechanical fan, and a rotational drive motor configured to rotate the mechanical fan. An embodiment includes a linear drive motor configured to translate the drive shaft and mechanical fan in a direction parallel to a longitudinal axis of the shroud. The convertible ducted fan engine includes a fluid-propulsion configuration in which the mechanical fan rotates freely with respect to the shroud to produce thrust through fluid flow, and a drive-wheel configuration in which the shroud rotates about the rotational axis.

20 Claims, 11 Drawing Sheets

(56) References Cited

OTHER PUBLICATIONS

CN-204488372—(Xue et al.; Jul. 22, 2015) English Translation (Year: 2022).*
CN-107719049—(Jia et al.; Feb. 23, 2018) English Translation (Year: 2022).*
CN204506376U, Zhao et al. English Translation by EPO and Google (Year: 2022).*
Website https://www.turbosquid.com/3d-models/3in1-drone-car-boat-hybrid-sci-fi-3d-model-1327003, accessed Apr. 18, 2019.

* cited by examiner

CONVERTIBLE DUCTED FAN ENGINE

CROSS-REFERENCE TO RELATED APPLICATIONS

This nonprovisional application is a continuation-in-part of and claims priority to nonprovisional application Ser. No. 16/225,951, entitled "CONVERTIBLE DUCTED FAN ENGINE," filed Dec. 19, 2018 by the same inventor, which is a is a continuation-in-part of and claims priority to nonprovisional application Ser. No. 15/209,383, entitled "CONVERTIBLE DUCTED FAN ENGINE," filed Jul. 13, 2016, issued on Jan. 15, 2019 as Pat. No. 10,180,083, by the same inventor.

BACKGROUND OF THE INVENTION

1. Field of the Invention

This invention relates, generally, to a ducted fan engine. More specifically, it relates to a ducted fan engine capable of converting between a typical fluid-propulsion configuration and a friction-based drive-wheel configuration.

2. Brief Description of the Prior Art

The current state of the art includes a plurality of distinct thrust producing engines. Typically, these engines are single purpose drive systems designed around the type of vehicle (e.g. ground vehicles, watercraft, or aircraft) on which they are intended to operate. For example, a drive-wheel—a tire connected to a rotating shaft—provides propulsion for land vehicles, while propellers or turbines are connected to a drive shaft to provide propulsion for aircrafts and watercrafts.

Some hybrid vehicles can operate in multiple mediums, such as, amphibious automobiles, which are capable of operating on land and water. Such vehicles, however, require separate or reconfigurable drive systems. For example, amphibious automobiles have a drive system for land-based travel and a separate propulsion system for aquatic-based travel. Both separate and reconfigurable drive systems are less than ideal. Reconfigurable drive systems can be complex and thus more susceptible to failure, while separate drive systems occupy twice the space and require twice the fuel compared to a single drive system.

Accordingly, what is needed is convertible engine that can operate as a fluid-propulsion engine and also as a friction-based drive-wheel. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a convertible engine that can operate as a fluid-propulsion engine and also as a friction-based drive-wheel is now met by a new, useful, and nonobvious invention.

The novel structure of the convertible ducted fan engine includes a shroud connected to a shroud shaft, a drive shaft connected to a mechanical fan, a rotational drive motor configured to rotate the drive shaft and mechanical fan, and a linear drive motor configured to translate the drive shaft and mechanical fan in a direction parallel to a longitudinal axis of the shroud shaft. The mechanical fan includes a plurality of blades concentrically arranged about a rotational axis. The fundamental functionality of this design encompasses any combination of mechanical (e.g. stops), electromechanical (e.g. actuated latches) or electrical (e.g. electromagnetic clutches or couplers) devices that facilitate both: 1) rotation of the shroud relative to the vehicle axle/body in the drive wheel configuration, and 2) facilitates fan rotation relative to a stationary shroud in the fluid propulsion configuration.

The convertible ducted fan engine includes a fluid-propulsion configuration in which the mechanical fan rotates freely with respect to the shroud to produce thrust through fluid flow, and a drive-wheel configuration in which at least one of the blades in the plurality of blades is in contact with or coupled to the shroud, thereby causing concurrent rotation of the shroud and mechanical fan when the mechanical fan rotates about the rotational axis.

In an embodiment, the drive shaft is configured to move the mechanical fan both (1) into contact with the shroud to place the ducted fan engine into the drive-wheel configuration and (2) out of contact with the shroud to place the ducted fan engine into the fluid-propulsion configuration. An embodiment includes the shroud shaft aligned with the rotational axis and the drive shaft configured to telescopically receive the shroud shaft. In an embodiment this arrangement could be reversed with the fan translating on the telescoping shaft and the shroud mounted to the axle shaft.

In an embodiment, the ducted fan engine includes a blade-contacting flange disposed on an internal surface of the shroud and extending a distance inwardly towards the central longitudinal axis of the shroud. The blade-contacting flanges extends inwardly a distance that is greater than the difference between the outer diameter of the mechanical fan and the inner diameter of the shroud.

An embodiment includes the blade-contacting flange located proximate to a fore end of shroud, such that the drive-wheel configuration is achieved by translating the mechanical fan towards the fore end of the shroud until at least one of the blades in the plurality of blades comes in contact with the blade-contacting flange. The fluid-propulsion configuration is achieved by translating the mechanical fan towards an aft end of the shroud until none of the blades in the plurality of blades can contact the blade-contacting flange when the mechanical fan rotates about the rotational axis.

An embodiment further includes a tread disposed on an outer surface of the shroud. The tread increases the traction between a shroud-contacting surface and the shroud when the ducted fan engine operates in the drive-wheel configuration.

An embodiment includes a drive shaft and a translation collar, wherein the drive shaft is configured to translate in a direction parallel to a longitudinal axis of the translation collar. A mechanical fan is interconnected with the drive shaft, such that movement of the drive shaft in an axial direction causes movement of the mechanical fan in the axial direction. The mechanical fan has a plurality of blades concentrically arranged about a rotational axis and is configured to rotate about the rotational axis. In addition, a shroud is interconnected with the translation collar. The embodiment includes a fluid-propulsion configuration in which the mechanical fan rotates freely with respect to the shroud to produce thrust through fluid flow and a drive-wheel configuration in which at least one of the blades in the plurality of blades is incapable of rotating with respect to the shroud, thereby causing concurrent rotation of the shroud and mechanical fan when the mechanical fan rotates about the rotational axis.

In an embodiment, the drive-wheel configuration includes at least one of the blades in the plurality of blades in contact or coupled to the shroud. An embodiment further includes the translation collar having a linear drive motor to translate the mechanical fan parallel to a longitudinal axis of the shroud.

Like previous embodiments, this embodiment may also include a blade-contacting flange disposed on an internal surface of the shroud and extending a distance inwardly towards the central longitudinal axis of the shroud, where the distance is greater than the difference between an outer diameter of the mechanical fan and the inner diameter of the shroud.

In an embodiment, the ducted fan engine includes an outer shroud encircling a plurality of blades with the shroud having an electrical coil connected to a power source. A collar is concentrically located with respect to the outer shroud and receives at least a portion of a proximal body in a rotationally free relation. A first clutch is disposed between the collar and the proximal body, wherein the first clutch can be engaged to prevent relative rotation between the collar and the proximal body. The proximal body is secured to a mounting arm at a first end and is in rotational communication with a distal body at a second end. The distal body is in mechanical communication with the plurality of blades and a second clutch is disposed between the proximal and distal bodies. The second clutch can be engaged to prevent relative rotation between the proximal and distal bodies. In addition, at least one blade in the plurality of blades has a magnetic component disposed proximate a free end of the blade. The electrical coil can be electrified to cause or prevent rotation of the plurality of blades with respect to the shroud, and the first and second clutches enable the ducted fan engine to operate as a propulsion engine or a drive wheel.

In an embodiment, operation as the propulsion engine includes the first clutch engaged to prevent the proximal body from rotating with respect to the collar secured to the shroud, the second clutch disengaged to allow the distal body to rotating with respect to the proximal body, and the electrical coil being electrifying to cause the plurality of blades to rotate with respect to the shroud.

In an embodiment, operation as the drive wheel includes the first clutch disengaged to allow the collar secured to the shroud to rotate with respect to the proximal body, the second clutch engaged to prevent the distal body secured to the plurality of blades from rotating with respect to the proximal body, and the electrical coil electrified to cause the shroud to rotate with respect to the plurality of blades.

An embodiment of the present invention is a convertible craft having at least one convertible ducted fan engine pivotally secured to the craft. The ducted fan engine includes a shroud encircling a mechanical fan. The shroud has an internal surface establishing an inner diameter that is greater in size than an outer diameter of the mechanical fan. The mechanical fan has a plurality of blades concentrically arranged about a rotational axis, wherein each blade in the plurality of blades has an extent originating from the rotational axis and terminating at a distal free end. The distal free ends of each blade effectively create the outer diameter of the mechanical fan. a fluid-propulsion configuration in which the plurality of blades are free to rotate with respect to the shroud to produce thrust through fluid flow; and a drive-wheel configuration in which an outer surface of the shroud is in physical contact with a ground surface and the shroud is configured to rotate about the rotational axis, thereby enabling the shroud to roll along the ground surface.

An embodiment further includes a drive shaft. The mechanical fan is configured to translate in an axial direction along the drive shaft, thereby enabling the mechanical fan to change location within the shroud along the longitudinal axis of the shroud.

An embodiment further includes a blade-contacting flange located proximate to a fore end of the shroud, such that the drive-wheel configuration is achieved by translating the mechanical fan along the translation shaft towards the fore end of the shroud until at least one of the blades in the plurality of blades comes in contact with the blade-contacting flange. The fluid-propulsion configuration is achieved by translating the mechanical fan along the translation shaft towards an aft end of the shroud until none of the blades in the plurality of blades can contact the blade-contacting flange when the mechanical fan rotates about the rotational axis. Other methods known to a person of ordinary skill in the art can be used to couple/decouple the fan and motor to achieve the two modes of operation.

An embodiment further includes a tread disposed on an outer surface of the shroud, thereby providing traction between a shroud-contacting surface and the shroud when the ducted fan engine operates in the drive-wheel configuration.

An embodiment of the craft further includes the convertible engine having an electrical coil disposed on or in the shroud and the electrical coil is connected to a power source. A collar is concentrically located with respect to the outer shroud, the collar receiving at least a portion of a proximal body in a rotationally free relation. A first clutch is disposed between the collar and the proximal body. The first clutch can be engaged to prevent relative rotation between the collar and the proximal body. The proximal body is secured to a mounting arm at a first end and is in rotational communication with a distal body at a second end. The distal body is in mechanical communication with the plurality of blades and a second clutch is disposed between the proximal and distal bodies. The second clutch can be engaged to prevent relative rotation between the proximal and distal bodies. In addition, at least one blade in the plurality of blades has a magnetic component disposed proximate a free end of the blade. The electrical coil can be electrified to cause or prevent rotation of the plurality of blades with respect to the shroud, and the first and second clutches enable the ducted fan engine to operate as a propulsion engine or a drive wheel.

In an embodiment of the convertible craft, the operation of the convertible engine as a propulsion engine includes the first clutch engaged to prevent the proximal body from rotating with respect to the collar secured to the shroud, the second clutch disengaged to allow the distal body to rotating with respect to the proximal body, and the electrical coil being electrifying to cause the plurality of blades to rotate with respect to the shroud.

In an embodiment of the convertible craft, the operation of the convertible engine as a drive wheel includes the first clutch disengaged to allow the collar secured to the shroud to rotate with respect to the proximal body, the second clutch engaged to prevent the distal body secured to the plurality of blades from rotating with respect to the proximal body, and the electrical coil electrified to cause the shroud to rotate with respect to the plurality of blades.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Glossary of Claim Terms

Drive-Wheel Configuration: is a configuration where the shroud is configured to rotate about the rotational axis.

Fluid-Propulsion Configuration: is a configuration where the mechanical fan is configured to rotate about the rotational axis.

Shroud: is a structure intended to at least partially surround the mechanical fan.

Tread: is a material disposed on the external surface of the shroud that is intended to increase traction between the shroud and the shroud-contacting surface.

The present invention includes a convertible ducted fan engine having a drive-wheel configuration and a fluid-propulsion configuration. The convertible ducted fan engine includes a shroud and a mechanical fan. In the drive-wheel configuration, the shroud is configured to rotate about the rotational axis. As a result, the shroud effectively becomes a rotating drive-wheel. In the fluid-propulsion configuration, the mechanical fan is free to rotate about the rotational axis, with respect to the shroud, to produce thrust as is typical with a propeller.

Figure 1A:
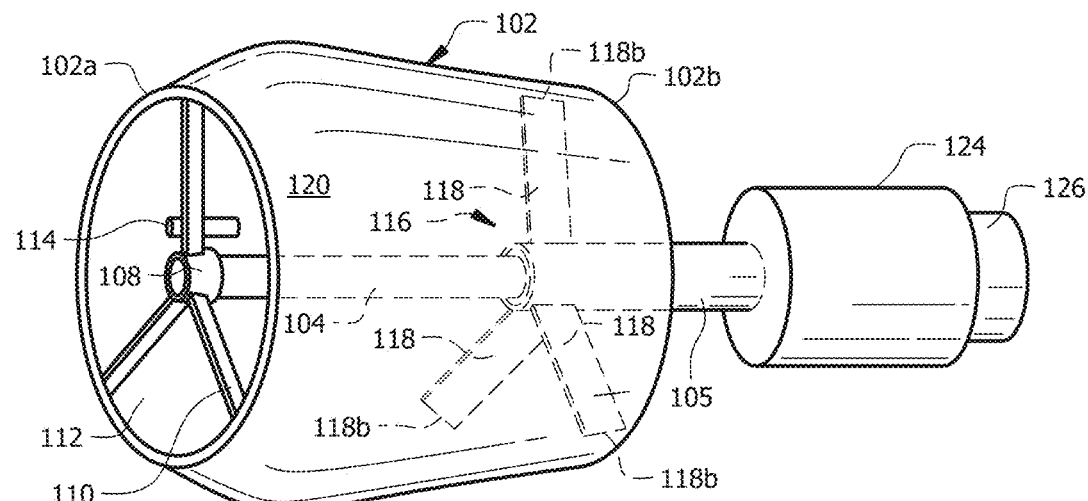
FIG. 1A is a perspective view of an embodiment of the present invention, in which the mechanical fan is retracted towards the aft end of the shroud such that rotation of the mechanical fan does not cause rotation of the shroud.
Figure 1B:
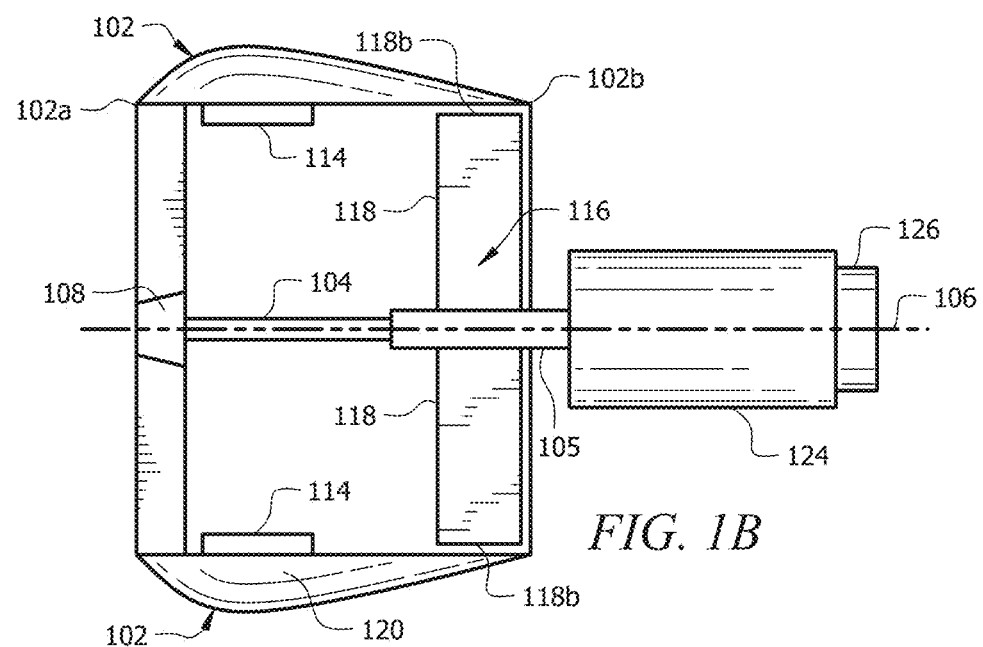
FIG. 1B is a top view of the embodiment shown in FIG. 1A with an upper section of the shroud removed to view the internal area of the shroud.
Figure 2A:
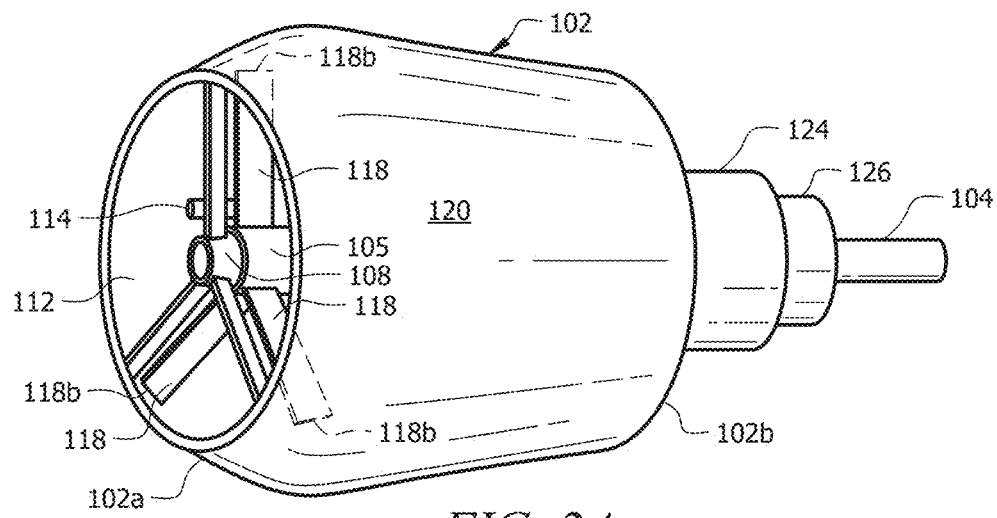
FIG. 2A is a perspective view of an embodiment of the present invention, in which the mechanical fan is located proximate to the fore end of the shroud such that rotation of the mechanical fan causes rotation of the shroud.

Referring now to FIGS. 1-2, an embodiment of the convertible ducted fan engine includes shroud 102 secured to a shroud shaft 104 at fore end 102a of shroud 102. Shroud shaft 104 is centrally aligned with longitudinal axis 106 of shroud 102 through collar 108. Collar 108 is also centrally aligned with longitudinal axis 106 and is fixed in place through supports 110, which extend radially to the internal surface 112 of shroud 102. An embodiment may include a secondary collar and corresponding supports secured to the aft end of the shroud. The secondary collar would be sized to slidably receive drive shaft 105 at a location aft of the mechanical fan 116 so as not to impair the translation of the mechanical fan 116. As an alternative, the secondary collar slidably receives the motor housing 124 rather than drive shaft 105. Such an embodiment would require the motor housing to remain at least partially within the shroud in both the drive-wheel and the fluid-propulsion configuration.

Internal surface 112 also includes blade-contacting flange 114 extending inwardly towards longitudinal axis 106. Blade-contacting flange 114 extends inwardly a distance that is greater than the difference between the inner diameter of shroud 102 and the outer diameter of mechanical fan 116. The outer diameter of mechanical fan 116 is established by distal free ends 118b of blades 118. As depicted in the exemplary embodiment, blade-contacting flange 114 is disposed proximate to fore end 102a of shroud 102. Blade-contacting flange 114, however, may be located anywhere along internal surface 112, such that blades 118 can contact blade-contacting flange 114 when mechanical fan 116 is moved into radial alignment with blade-contacting flange 114. In an embodiment, several blade-contacting flanges may be disposed on internal surface 112 to better secure mechanical fan 116 when the engine is in the drive-wheel configuration. An embodiment may include other methods known to a person of ordinary skill in the art to couple/decouple the fan and motor to achieve the two modes of operation.

Figure 2B:
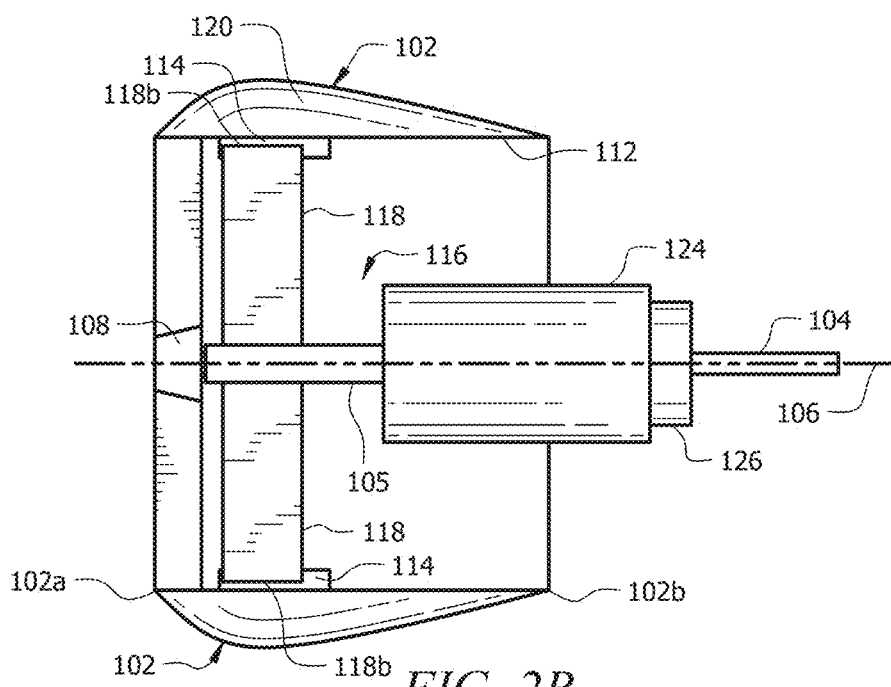
FIG. 2B is a top view of the embodiment shown in FIG. 2A with an upper section of the shroud removed to view the internal area of the shroud.

As mostly clearly depicted shown in FIGS. 1B and 2B, internal surface 112 of the exemplary embodiment is cylindrical in shape. The uniform cylindrical shape allows mechanical fan 116 to freely transition between the fore and aft ends 102a, 102b of shroud 102. Or in other words, mechanical fan 116 can easily move (1) into radial/transversal alignment with blade-contacting flange 114 as shown in FIG. 2B, and (2) out of radial/transversal alignment with blade-contacting flange 114 as shown in FIG. 1B. In an embodiment, the cross-section of internal surface 112 may be non-uniform along longitudinal axis 106 of shroud 102. A non-uniform cross-section may be used instead of one or more blade-contacting surfaces to establish concurrent rotation of the mechanical fan and the shroud. For example, the internal surface may be tapered at a certain location along the longitudinal axis of the shroud giving the tapered section an internal diameter that is equal to or less than the outer diameter of the mechanical fan. Translation of the mechanical fan into the tapered section press-fits the mechanical fan into the tapered section to allow for concurrent rotation of the mechanical fan and the shroud. Alternatively, the tapered section may include a plurality of grooves to receive the blades, which has a similar functionality as the blade-contacting flange.

As depicted in the exemplary embodiment shown in FIGS. 1, shroud 102 has a length, extending about longitudinal axis 106, that is greater than the combined length of blade-contacting flange 114 and mechanical fan 116. The lengths of blade-contacting flange 114 and mechanical fan 116 also extend in a direction parallel to the longitudinal axis. The minimum length of shroud 102 is preferably at least the combined length of blade-contacting flange 114 and blades 118. An embodiment, however, may include a shroud not intended to house the mechanical fan when the convertible ducted fan engine is in the fluid-propulsion configuration. Such an embodiment may employ a shroud having a length less than the embodiment shown in FIGS. 1-2. Preferably, the length of the shroud would at least match the length of the mechanical fan.

External surface 120 of shroud 102 includes an aerodynamic taper from fore end 102a to aft end 102b. The tapered shape reduces aerodynamic drag when the convertible ducted fan engine is operating as a fluid-propulsion engine. In an embodiment, the external surface 120 has a non-tapered shape to provide greater traction when the convertible ducted fan engine is operating as a drive-wheel. In an embodiment, external surface 120, includes tread for improving traction when the convertible ducted fan engine is operating as a drive-wheel. In addition, the tread may include longitudinal grooves to improve aerodynamic performance when the convertible ducted fan engine is operating as a fluid-propulsion engine. The tread may include any combination of grooves to improve traction and/or decrease aerodynamic drag.

In an embodiment, external surface 120 of shroud 102 includes one or more bands/ribs of material wrapped around the outer surface of the shroud. For example, external surface 120 may be axially ribbed, which would improve traction and would have a minimal effect on airflow over the external surface of the shroud. Moreover, an embodiment includes a shroud that is easily removable for maintenance or replacement. Detachable collar(s) and corresponding supports allows the mechanical fan to easily exit the shroud for maintenance/replacement.

In an embodiment, screens are added to the fore and/or aft ends of the shroud to reduce the possibility of large objects accumulating in the inner surface of the shroud. This, combined with a controlled process between configurations would minimize possibility of damage to the mechanical fan. This situation is far more critical to the airborne application as the waterborne application would naturally wash material from the internal surface of the shroud after transitioning to water.

Mechanical fan 116 includes a plurality of blades 118 extending outwardly from drive shaft 105. The distal ends of each blade establish an outer diameter of the mechanical fan. As depicted in the exemplary embodiment shown in FIGS. 1-2, the blades are sized so that the outer diameter of the mechanical fan is less than the diameter of internal surface 112 of shroud 102, but greater than the difference between the diameter of internal surface 112 and the distance blade-contacting flange 114 extends inwardly towards longitudinal axis 106. As most clearly shown in FIG. 1B, the size of the outer diameter of mechanical fan 116 allows mechanical fan 116 to freely rotate about longitudinal axis 106 when mechanical fan 116 is disposed proximate to aft end 102b of shroud 102 and out of contact with blade-contacting flange 114. As most clearly shown in FIG. 2B, when mechanical fan 116 is translated to fore end 102a of shroud 102, the size of the outer diameter of mechanical fan 116 enables blades 118 to contact blade-contacting flange 114 causing concurrent rotation of mechanical fan 116 and shroud 102.

It should be noted that the blades are currently depicted in a simple rectangular shape. The blades however, may be angled, such that the width of the proximal end of each blade is angled with respect to the longitudinal axis of the drive shaft. In addition, or alternatively, the blades may include a corkscrew shape extending about the length of each blade.

The exemplary embodiment shown in FIGS. 1-2 includes a hollow drive shaft 105 sized to receive and translate along the length of shroud shaft 104. Moreover, drive shaft 105 is adapted to rotate with respect to shroud shaft 104. Drive shaft 105 and/or shroud shaft 104 may include bearings, or other similar friction reducing objects, materials, and/or fluids, disposed between the two shafts to reduce the friction between the two shafts during both rotation and translation of drive shaft 105 with respect to shroud shaft 104.

The rotation of drive shaft 105 is controlled via a rotational drive motor (not visible) disposed in motor housing 124. The rotational drive motor is adapted to rotate drive shaft 105 in both a clockwise and a counter-clockwise direction. The translation of drive shaft 105 along shroud shaft 104 is controlled via linear drive motor 126. Linear drive motor 126 enables the convertible ducted fan engine to translate between the fluid-propulsion configuration shown in FIGS. 1 and the drive-wheel configuration shown in FIGS. 2. Regardless of the configuration, linear drive motor 126 remains in communication with shroud shaft 104 to maintain control of the translation of mechanical fan 116.

Figure 3A:
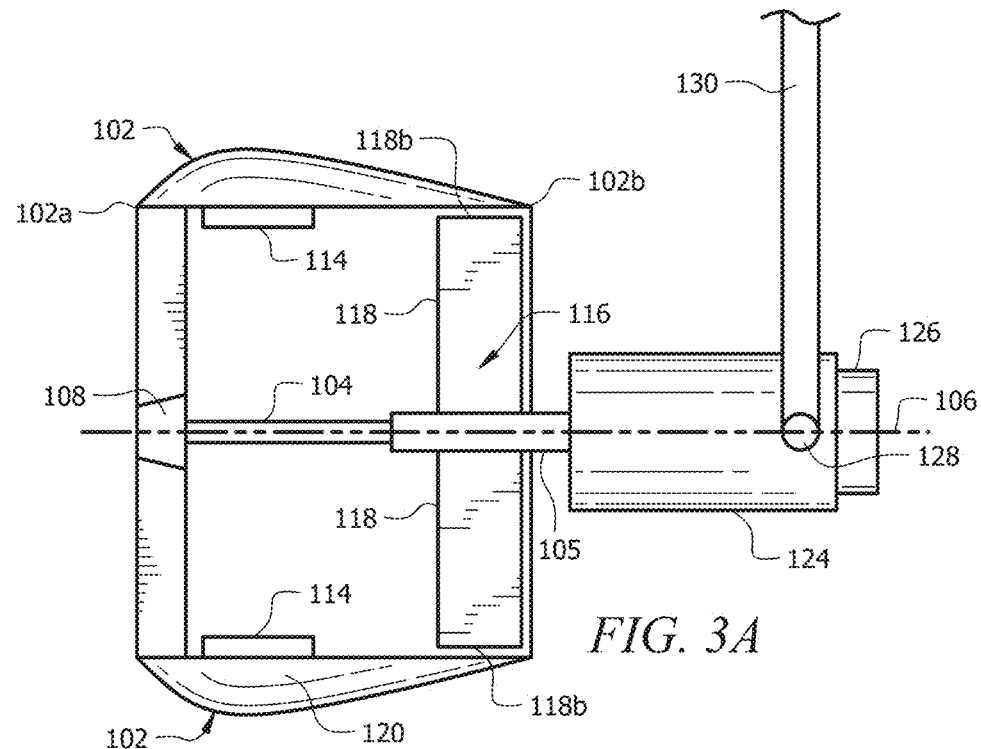
FIG. 3A is a profile view of an embodiment of the convertible ducted fan engine oriented vertically.
Figure 3B:
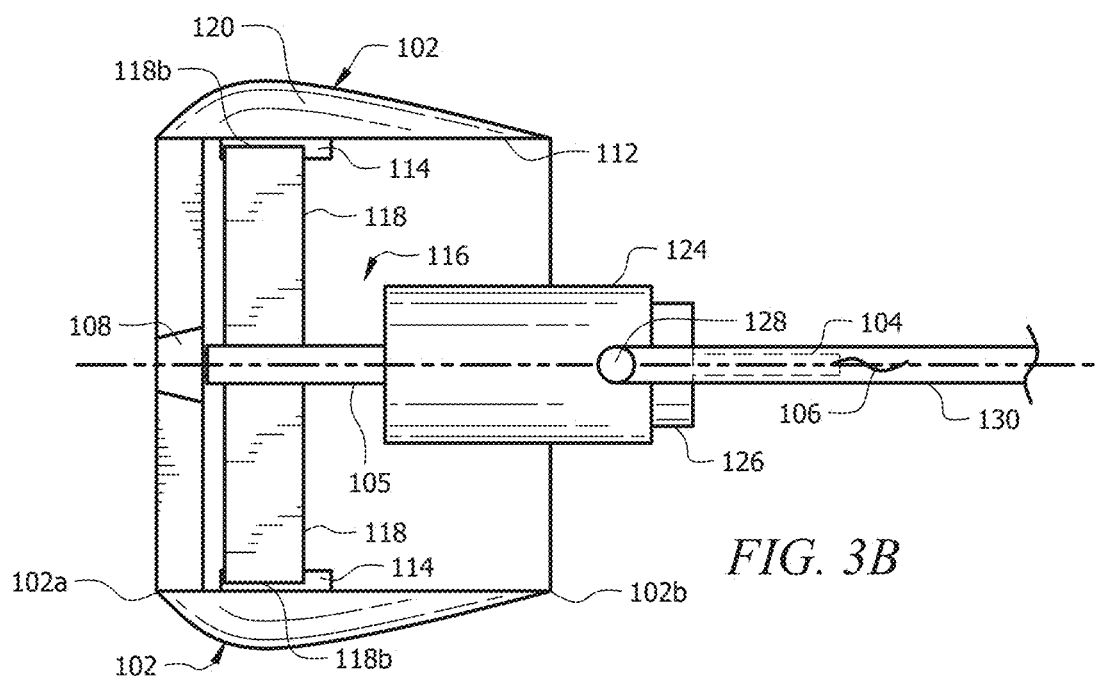
FIG. 3B is a profile view of the embodiment in FIG. 3A pivoted to a horizontal orientation.

Referring now to FIGS. 3, an embodiment of the convertible ducted fan engine includes mounting arm 130 pivotally connected to motor housing 124 through pivoting connection 128. Pivoting connection 128 is controlled by a motor and allows the convertible ducted fan engine to easily transition between different orientations. For example, the convertible ducted fan engine may be vertically oriented in the fluid-propulsion configuration as shown in FIG. 3A and can pivoted into a horizontal configuration when the convertible ducted fan engine is converted into the drive-wheel configuration as shown in FIG. 3B. The embodiment provided in FIG. 3 is a simplistic example of how the orientation of the convertible ducted fan engine can be altered. The number, shape, and complexity of mounting arm(s) 130 and pivoting connection(s) 128 is dependent on the vehicle powered by the convertible ducted fan engine(s) and the intended functional ability of that vehicle. A more complex embodiment of the pivoting convertible ducted fan engine may include one or more multidirectional pivoting connections 128 giving the convertible ducted fan engine 360° thrust vectoring and steering capabilities.

Referring now to FIGS. 4, an embodiment of the convertible ducted fan engine is adapted to translate the mechanical fan in a linear direction without relying on a shroud shaft. As depicted, said embodiment includes a hollow translation collar 132 sized to receive motor housing 124 within central bore 134. Translation collar 132 is at least partially located within shroud 102 and is concentrically secured with respect to shroud 102 through at least two radially extending supports 136 that span from the internal surface 112 of shroud 102 to outer surface 138 of translation collar 132. Translation collar 132 thus provides the slidable support through which motor housing 124 can translate.

Drive shaft 105 has a fixed length extending to blades 118. Thus, motor housing 124 is translated through translation collar 132 to bring blades 118 into and out of contact with blade-contacting flanges 114. Moreover, motor housing 124 is adapted to rotate with respect to translation collar 132. Translation collar 132 and/or motor housing 124 may include bearings, or other similar friction reducing objects, materials, and/or fluids, disposed between their respective contacting surfaces to reduce friction during both rotation and translation of motor housing 124 with respect to translation collar 132.

The rotation of drive shaft 105 is controlled via a rotational drive motor (not shown) disposed in motor housing 124. The rotational drive motor is adapted to rotate drive shaft 105 in both a clockwise and a counter-clockwise direction. The translation of motor housing 124 within translation collar 132 is controlled via linear drive motor 126. Linear drive motor 126 enables the convertible ducted fan engine to translate between the fluid-propulsion configuration shown in FIG. 4A and the drive-wheel configuration shown in FIG. 4B. As depicted, linear drive motor 126 engages mounting arm 130. Linear drive motor 126 may be any linear drive mechanism known to a person of ordinary skill in the art, including but not limited to mechanical gears and motors and electromagnetic mechanisms. In addition, an embodiment, such as the one depicted in FIG. 4B, may include the linear drive motor (not depicted to improve clarity) residing between the outer surface of motor housing 124 and the inner surface of translation collar 132 to drive motor housing 124. Linear drive motor 126 may also employ electromagnetic mechanisms that use magnetic fields to translate motor housing 124 between the fore and aft ends of translation collar 132.

Figure 4A:
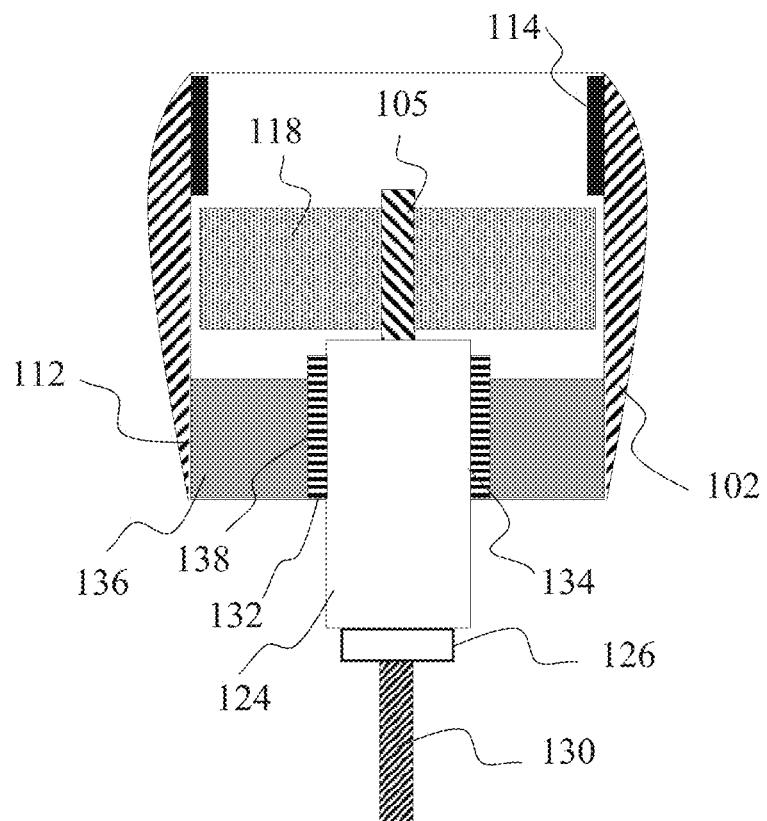
FIG. 4A is a top view of an embodiment of the present invention with an upper section of the shroud removed to view the internal area of the shroud.
Figure 4B:
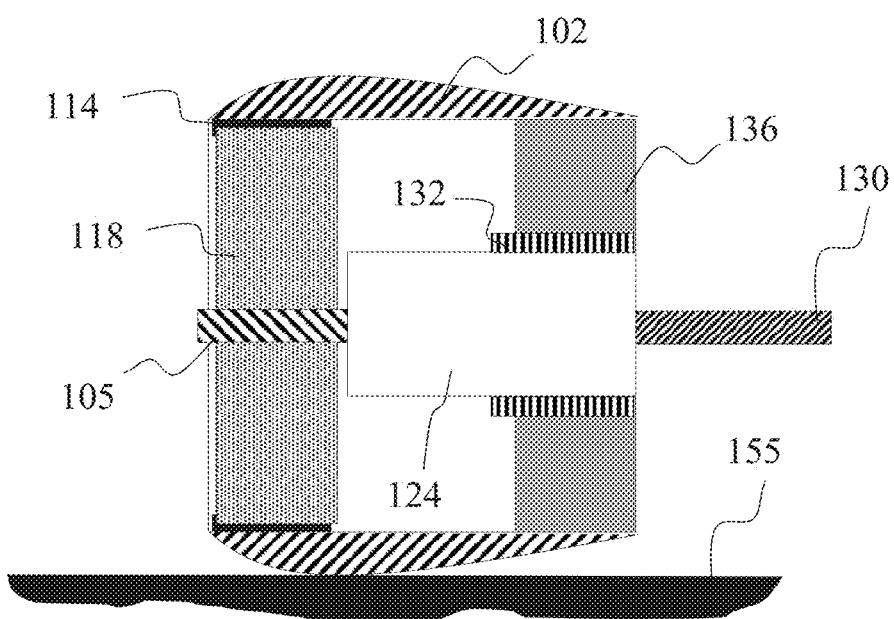
FIG. 4B is a top view of an embodiment of the present invention with an upper section of the shroud removed to view the internal area of the shroud.

As depicted in FIG. 4A, the engine is in a propulsion configuration. Blades 118 are free to rotate within shroud 102 to create thrust as is typical in a propulsion engine. In FIG. 4B, the engine has converted to the terrestrial wheel configuration in which blades 118 are in contact with blade-contacting flanges 114. The rotation of blades 118 cause shroud 102 to rotate and can thus drive an attached vehicle (as depicted din FIGS. 7) over land. As previously explained, mounting arm 130 is preferably pivotally connected to the craft to alter the orientation of the engine with respect to the ground/craft.

Figure 5:
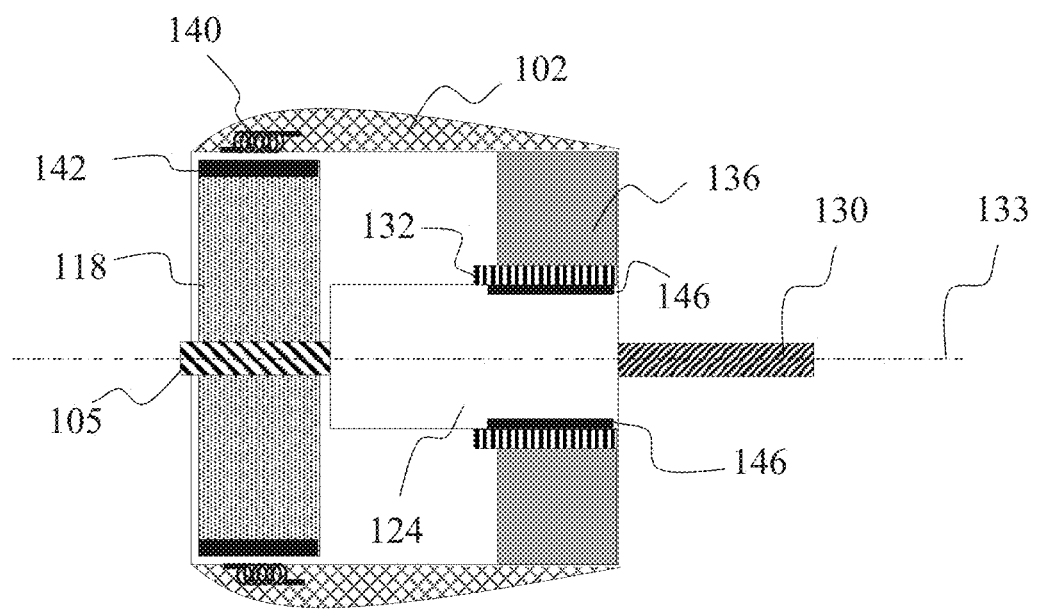
FIG. 5 is a top view of an embodiment of the present invention with an upper section of the shroud removed to view the internal area of the shroud.

In an embodiment, as depicted in FIG. 5, the blade-contacting flanges are replaced by electromagnetic components. Rather than a mechanical engagement between blades 118 and shroud 102, the embodiment relies on electromagnetic (EM) coils 140, magnetic elements 142, and a power source connected to coils 140. The power source may be secured on the craft to which mounting arm 130 is intended to attach. Wires connected to the power source pass through mounting arm 130 and connect to coils 140. By providing current to coils 140, the system can lock blades 118 relative to shroud 102 to prevent rotation of blades 118 within shroud 102. When blades 118 are locked with respect to shroud 102, actuation of the motor will cause both the blades and the shroud to rotate about motor housing 124. Thus, collar 132 is adapted to allow motor housing 124 to rotate within collar 132 so that the engine can operate as a wheel.

This embodiment also preferably includes clutch 146 disposed between the inner surface of collar 132 and the outer surface of motor housing 124. Clutch 146 is engaged to collar 132 and in turn shroud 102 when in the propulsion mode to prevent shroud 102 from rotating about axis 130 when blades 118 and their respective magnetic components 142 rotate with respect to coils 140 disposed within shroud 102. Clutch 146 is disengaged when the engine is operating in the wheel configuration to allow motor housing 124 to rotate within collar 132.

Figure 6:
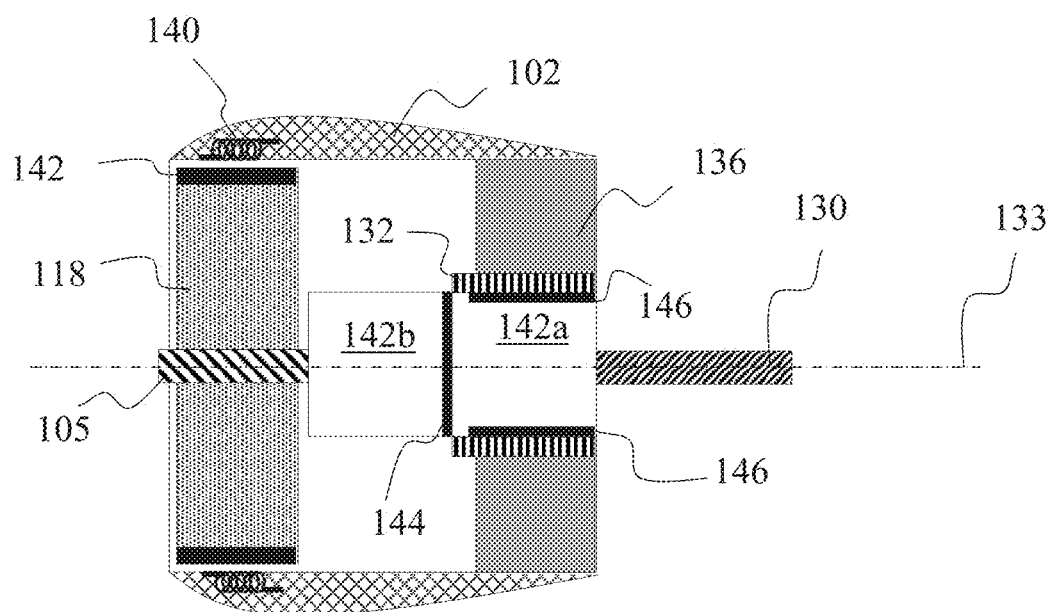
FIG. 6 is a top view of an embodiment of the present invention with an upper section of the shroud removed to view the internal area of the shroud.

Referring now to FIG. 6, an embodiment includes EM coils 140, magnetic elements 142, and a power source connected to coils 140 to create relative movement between shroud 102 and blades 118. The power source may be secured on a craft to which mounting arm 130 is intended to attach. Wires connected to the power source pass through mounting arm 130 and connect to coils 140. By providing current to coils 140, the system causes blades 118 to rotate relative to shroud 102. Effectively, the system is a deconstructed electric motor with the motors components split between the blades and the shroud.

As depicted in FIG. 6, EM coils 140 are disposed within or on an internal surface of shroud 102 and magnetic elements 142 are disposed on or in free ends 118b of blades 118. This embodiment can act as either a propeller and a terrestrial wheel. The method of actuation, however, is achieved by engaging/disengaging a pair of clutches 144, 146 and providing current to coils 140.

The depicted embodiment includes the motor housing simply acting as a main body, incorporating the clutch mechanisms. The main body is divided into proximal body 142a and distal body 124b with clutch 144 residing therebetween. Proximal body 124a resides at least partially within collar 132 and clutch 146 resides therebetween. Clutches 144 and 146 may be any clutches known to a person of ordinary skill in the art including mechanical, electrical, and electromagnetic clutches. Clutches 144 and 146 are also connected to a power source that preferably resides on the body of the craft to which mounting arm 130 is attached.

To operate as a propulsion engine, the clutches are adjusted to allow blades 118 to rotate within shroud 102 and shroud 102 is secured in a non-rotational state about axis 133. In operation as a propulsion engine, current is run through coils 140, which creates a magnetic field that drives magnetic components 142 on blades 118. Drive shaft 105 is fixedly secured to blades 118 and distal body 142b causing these components to rotate as a single body. Clutch 144 is disengaged allowing distal body 142b to rotate with respect to proximal body 142a. Clutch 146 is engaged to prevent rotation of collar 132, and in turn shroud 102, about proximal body 142a. Proximal body 142a is fixedly secured to mounting arm 130, so mounting arm 130, proximal body 142a, and shroud 102 do not rotate about axis 133, but blades 118 remain free to rotate within shroud 102 to produce thrust.

To operate as a wheel, clutch 144 is engaged so that blades 118, drive shaft 105, distal body 142b, proximal body 142a, and mounting arm 130 are rotationally fixed with respect to each other and thus do not rotate about axis 133 since mounting arm 130 is secured to a craft as depicted in FIGS. 7. Clutch 146 is disengaged to allow collar 132, and in turn shroud 102, to rotate about axis 133. When current is supplied to coils 140, shroud 102 rotates relative to magnetic components 142 that are attached to the rotationally fixed blades 118. In other words, shroud 102 becomes a wheel that rotates about axis 133.

Figure 7A:
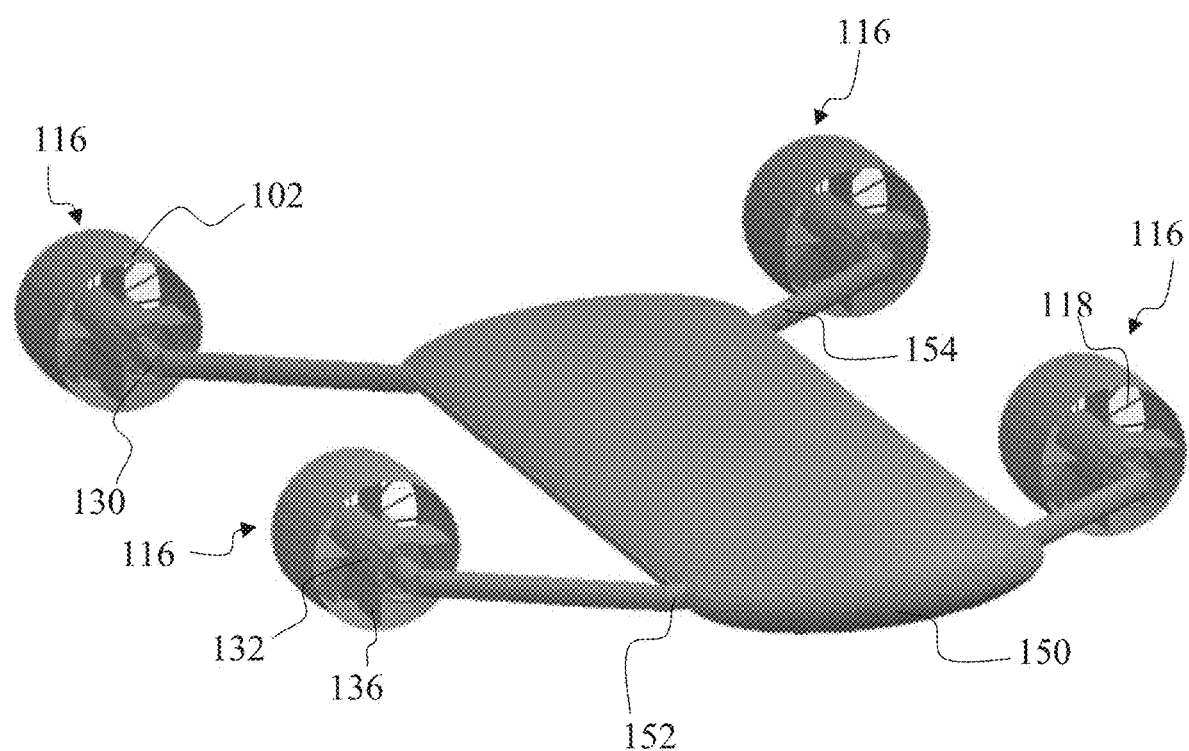
FIG. 7A is a perspective view of a craft having four convertible ducted engines in a forward thrust-driven configuration similar to that of a submersible.
Figure 7B:
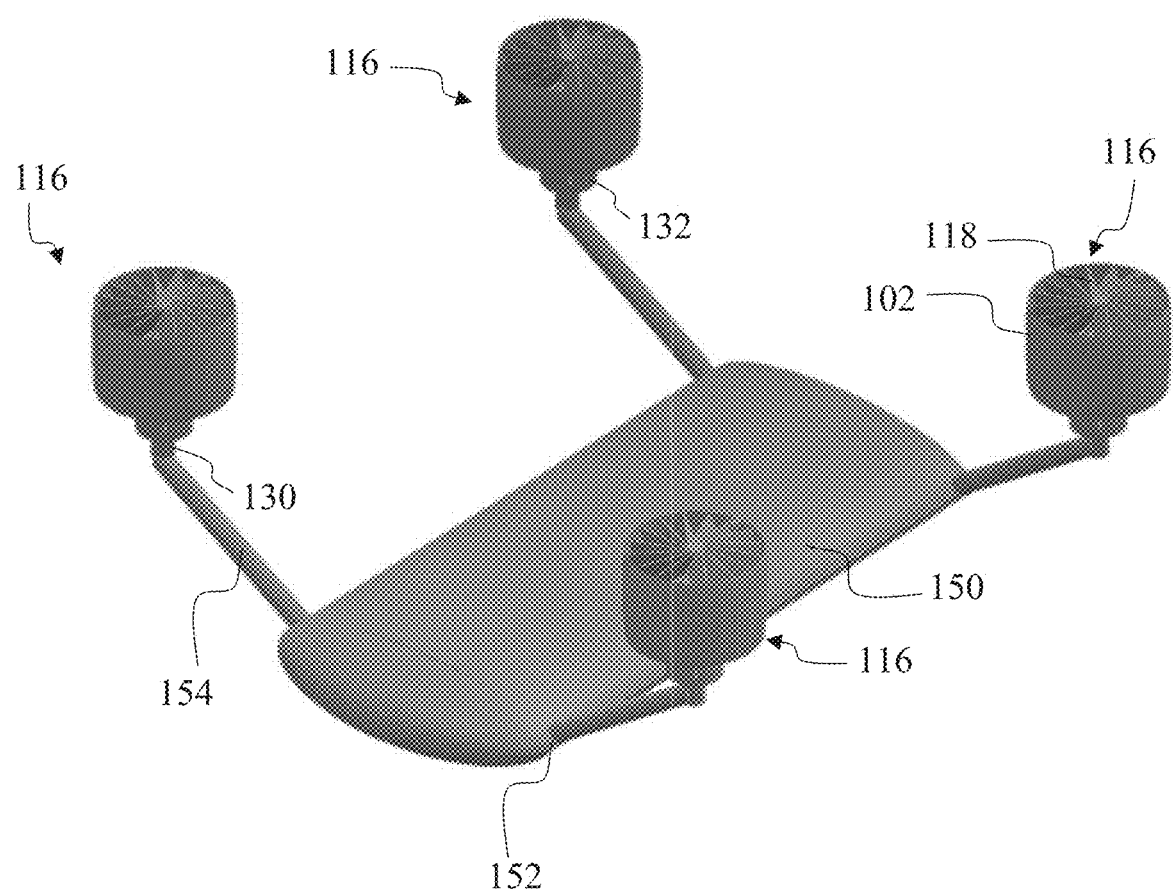
FIG. 7B is a perspective view of a craft having four convertible ducted engines in a vertical thrust-driven configuration similar to that of an aircraft.
Figure 7C:
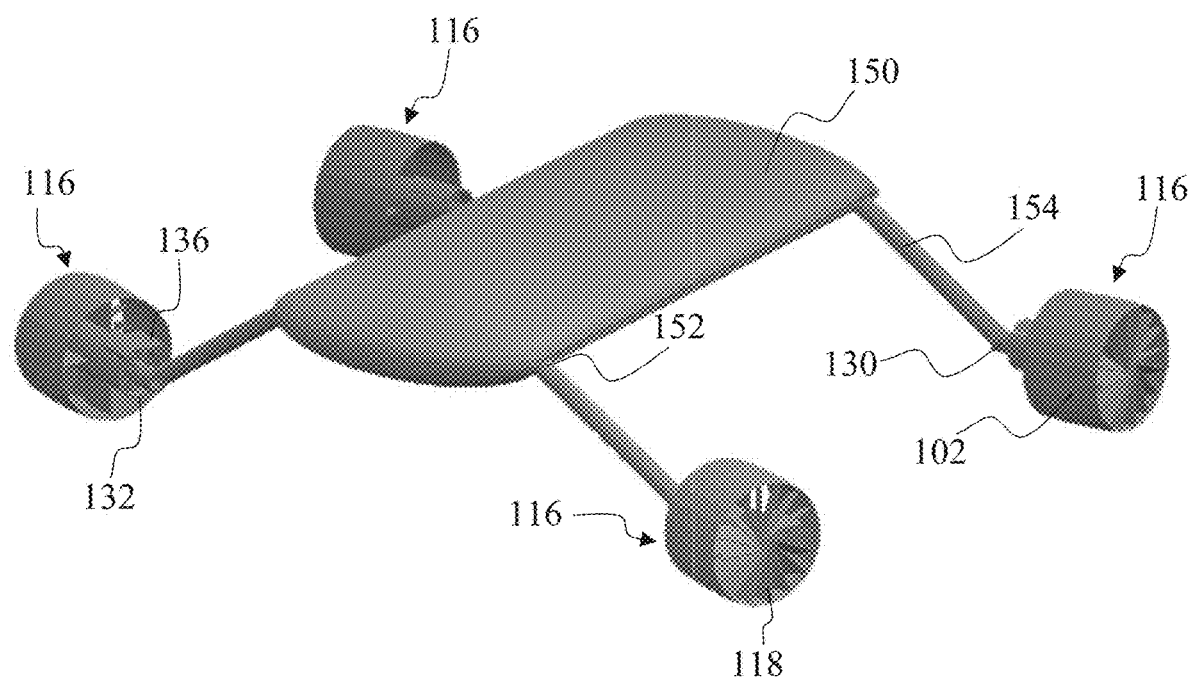
FIG. 7C is a perspective view of a craft having four convertible ducted engines in a drive-wheel configuration similar to that of a land vehicle.

Referring now to FIGS. 7, four engines 116 are secured to craft 150 via mounting arm 130 pivotally connected to extension arm 154 which is pivotally connected to body 150 or body extension arm 152. The pivotal connections allow the orientation of engines 116 to be individually manipulated. Accordingly, the craft can operate as a submersible as depicted in FIG. 7A, as a vertical takeoff/landing aircraft as depicted in FIG. 7B, and as a terrestrial wheel-drive vehicle as depicted in FIG. 7C.

While FIGS. 7 depict four engines 116, certain crafts may operate with a single convertible engine or multiple convertible engines having pivotal connections to the body of the craft. Moreover, the craft may have a morphable body shape such as a hybrid dirigible to expand the mission capabilities of the craft.

Referring now to FIGS. 8, an embodiment of the convertible engine includes motor 115 having rotational body 117, motor mount 119, and drive shaft 105. Drive shaft 105 is connected to rotational body 117 and mechanical fan 116 in a manner such that all three rotate simultaneously. Motor mount 119 is secured to rotational body 117 in a rotationally free manner, such that rotational body 117 can rotate with respect to motor mount 119.

In an embodiment, motor 115 is an electrical motor with motor mount 119 having the permanent magnets and rotational body 117 housing the electrical coils. It is considered, however, that the permanent magnets could be housed in the rotational body while the electrical coils are secured in the motor mount. It is also considered that certain embodiments may use other non-electrical motors, such as a conventional gas powered motor.

The embodiment depicted in FIGS. 8 further includes hollow translation collar 132 sized to receive mounting arm 130 within central bore 134. Translation collar 132 is preferably at least partially located within shroud 102 and is concentrically secured with respect to shroud 102 through preferably at least two radially extending supports 136 that span from the internal surface 112 of shroud 102 to outer surface 138 of translation collar 132. Translation collar 132 thus provides the slidable support through which mounting arm 130 can translate.

Distal end 132b of translation collar 132 includes motor mount engagement tabs 157, which are exemplarily shown as longitudinally extending teeth. Engagement tabs 157 are sized, shaped, and spaced to receive proximal end 119a of motor mount 119 and/or a mounting arm 130. Mounting arm 130, being slidably received by translation collar 132 and fixed to motor mount 119 via mounting plate 121, can pull motor mount 119 into engagement with translation collar 132 to prevent relative rotation between shroud 102 and motor mount 119.

Similar to other embodiments, shroud 102 also includes blade-contacting flange 114 extending inwardly from internal surface 112 towards longitudinal axis 106. Blade-contacting flange 114 extends inwardly a distance that is greater than the difference between the inner diameter of shroud 102 and the outer diameter of mechanical fan 116. As a result, blades 118 will contact blade-contacting flange 114 when mechanical fan 116 is translated towards blade-contacting flange 114 to bring the engine into the drive-wheel configuration.

As depicted in the exemplary embodiment, blade-contacting flange 114 is disposed proximate to fore end 102a of shroud 102. Blade-contacting flange 114, however, may be located anywhere along internal surface 112, such that blades 118 can contact blade-contacting flange 114 when mechanical fan 116 is moved into radial alignment with blade-contacting flange 114. In an embodiment, several blade-contacting flanges may be disposed on internal surface 112 to better secure mechanical fan 116 when the engine is in the drive-wheel configuration.

Figure 8B:
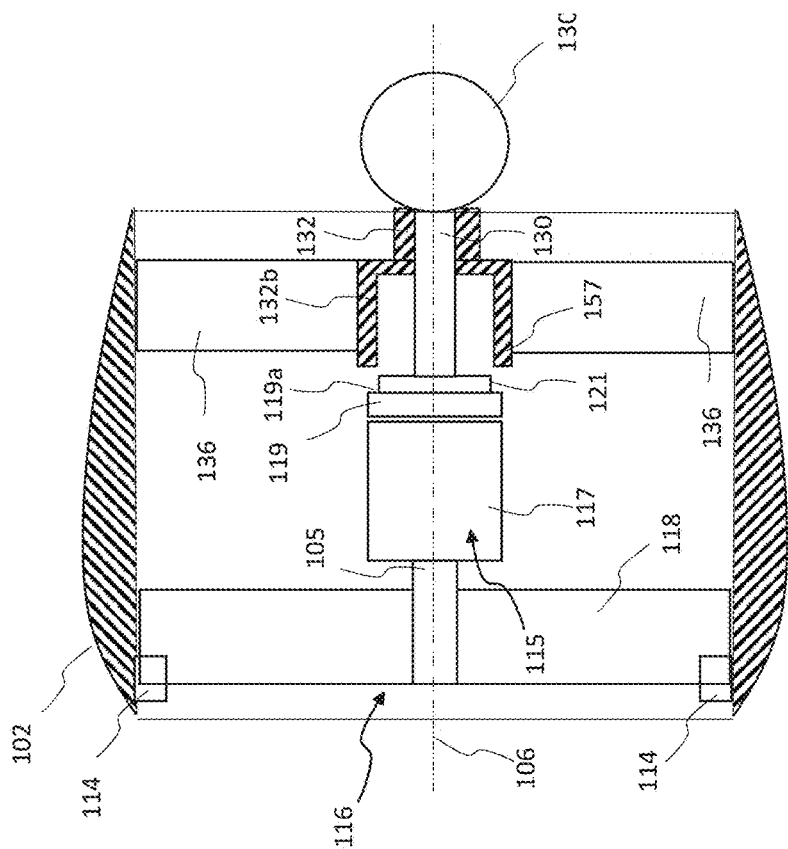
FIG. 8B is a sectional profile view depicting the embodiment of FIG. 8A in the drive wheel configuration.
Figure 8A:
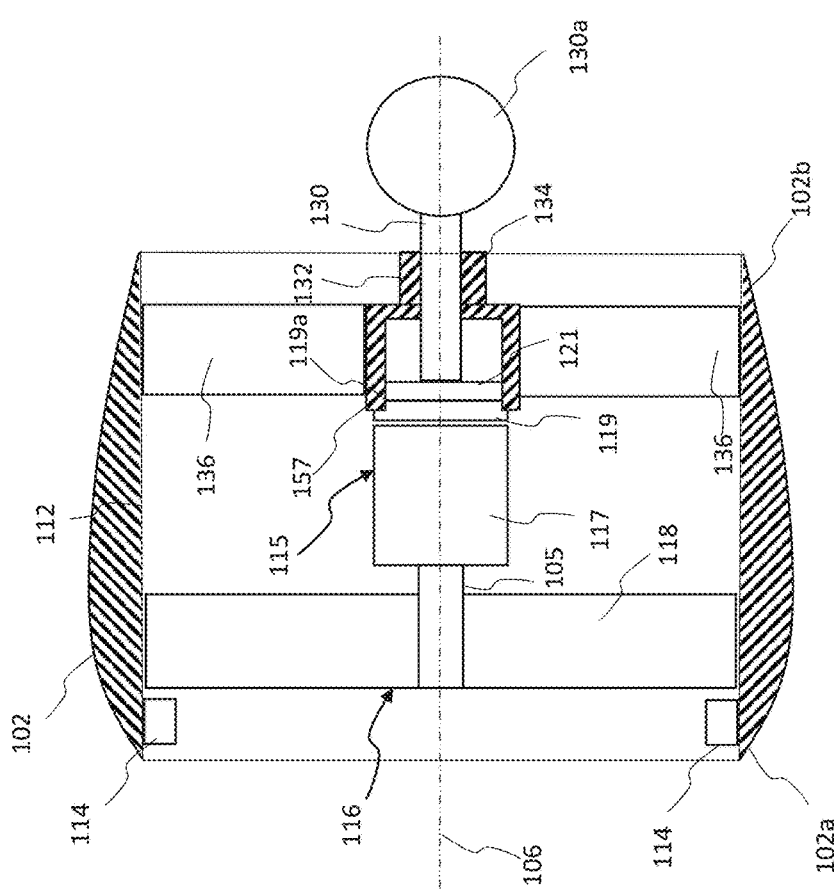
FIG. 8A is a sectional profile view depicting the internal components of an embodiment of the present invention when in the fluid propulsion configuration.

Internal surface 112 of the exemplary embodiment is preferably generally cylindrical in shape. A uniform cylindrical shape allows mechanical fan 116 to freely transition between the fore and aft ends 102a, 102b of shroud 102. Or in other words, mechanical fan 116 can easily move (1) into radial/transversal alignment with blade-contacting flanges 114 as shown in FIG. 8B, and (2) out of radial/transversal alignment with blade-contacting flanges 114 as shown in FIG. 8A. In an embodiment, the cross-section of internal surface 112 may be non-uniform along longitudinal axis 106 of shroud 102. A non-uniform cross-section may be used instead of one or more blade-contacting surfaces to establish concurrent rotation of the mechanical fan and the shroud. For example, the internal surface may be tapered at a certain location along the longitudinal axis of the shroud giving the tapered section an internal diameter that is equal to or slightly less than the outer diameter of the mechanical fan. Translation of the mechanical fan into the tapered section press-fits the mechanical fan into the tapered section to allow for concurrent rotation of the mechanical fan and the shroud. Alternatively, the tapered section may include a plurality of grooves to receive the blades, which has a similar functionality as the blade-contacting flange.

As depicted in the exemplary embodiment shown in FIGS. 8, shroud 102 has a length, extending about longitudinal axis 106, that is greater than the combined length of blade-contacting flange 114 and mechanical fan 116 in a longitudinal direction. The minimum length of shroud 102 is preferably at least the combined length of blade-contacting flange 114 and blades 118. An embodiment, however, may include a shroud not intended to fully house the mechanical fan when the convertible ducted fan engine is in the fluid-propulsion configuration. Such an embodiment may employ a shroud having a length less than the embodiment shown in the exemplary figures. Preferably, the length of the shroud at least matches the length of the mechanical fan.

An embodiment may rely on two or more clutches rather than the blade-contacting tabs and the engagement of the mount and the translation collar. A first clutch resides between the translation collar and the mount and a second clutch resides between the shroud and the mechanical fan, drive shaft, or rotating body of the motor. In an embodiment, there is a fore located collar 108 similar to the one shown in FIGS. 1-3. The second clutch resides between collar 108 and the mechanical fan. The propulsion configuration is achieved by engaging the first clutch to prevent rotation of the shroud with respect to the motor mount and disengaging the second clutch to allow the mechanical fan to rotate with respect to collar 108. The drive-wheel configuration is achieved by disengaging the first clutch to allow rotation of the shroud with respect to the motor mount and disengaging the second clutch to prevent the mechanical fan from rotating with respect to collar 108.

Figure 8D:
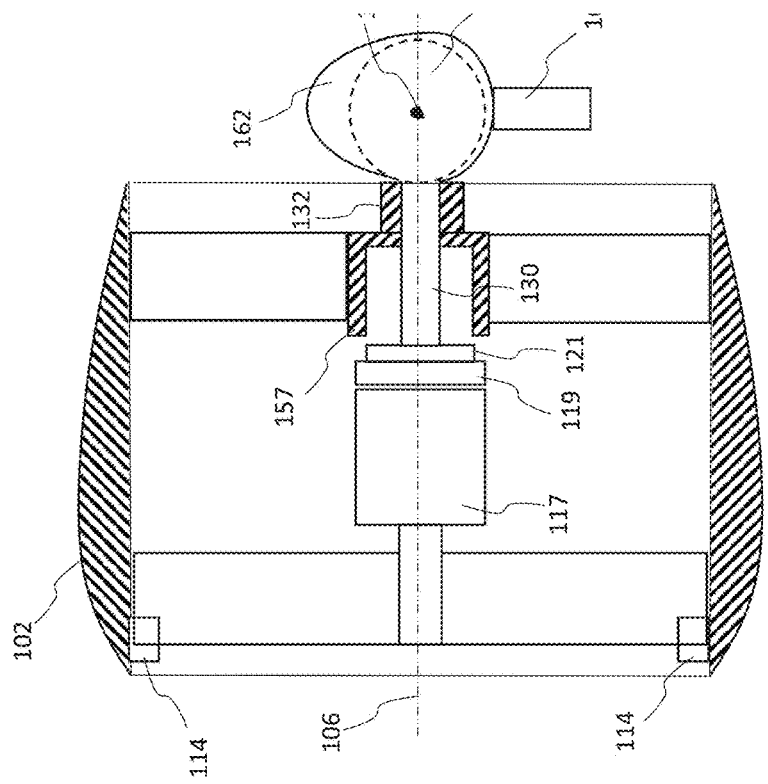
FIG. 8D is a sectional profile view depicting the embodiment of FIG. 8C in the drive wheel configuration.
Figure 8C:
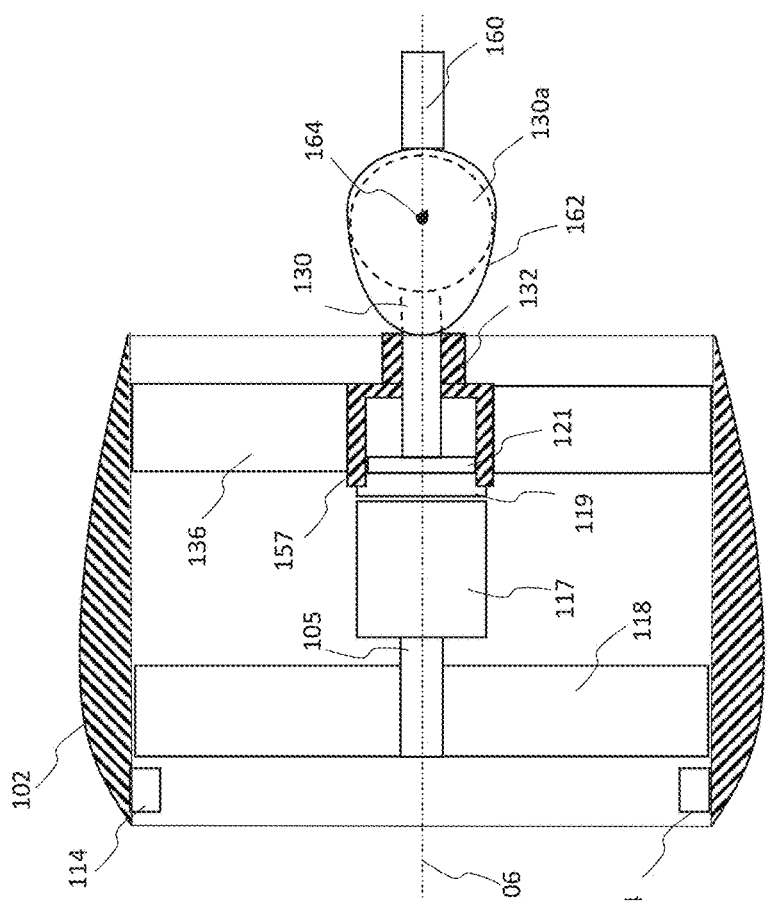
FIG. 8C is a sectional profile view depicting the internal components of an embodiment of the present invention when in the fluid propulsion configuration.

Referring now to FIGS. 8C and 8D, an embodiment of mounting arm 130 includes a rounded proximal end 130a coupled to articulating arm 160. Articulating arm 160 includes a non-circular distal end 162 or circular distal end having an offset axial engagement with proximal end 130a of mounting arm 130. As shown between FIGS. 8C and 8D, the rotation of articulating arm 160 causes distal end 162 to pivot about rotational axis 164 and causes linear actuation of mounting arm 130. In an embodiment, a biasing member, such as a spring resides between collar 132 and mounting plate 121 to help ensure translation of mounting arm 130.

In an embodiment, a linear drive motor translates mounting arm 130 through translation collar 132 to bring blades 118 into and out of contact with blade-contacting flanges 114. Translation collar 132 and/or mounting arm 130 may include translation gear assemblies between their respective contacting surfaces to allows for the translation of mounting arm 130 through translation collar 132. The linear drive motor may be any linear drive mechanism known to a person of ordinary skill in the art, including but not limited to mechanical gears, motors, and electromagnetic mechanisms.

As most clearly shown in FIGS. 8A and 8C, the size of the outer diameter of mechanical fan 116 allows mechanical fan 116 to freely rotate about longitudinal axis 106 when mechanical fan 116 is disposed proximate to aft end 102b of shroud 102 and out of contact with blade-contacting flanges 114. In addition, translation collar 132 engages motor mount 119 to prevent rotation of shroud 102 with respect to motor mount 119. As most clearly shown in FIGS. 8B and 8D, when mechanical fan 116 is translated to fore end 102a of shroud 102 and translation collar 132 disengages motor mount 119, mechanical fan 116 contacts blade-contacting flange 114 causing concurrent rotation of mechanical fan 116 and shroud 102.

Figure 9B:
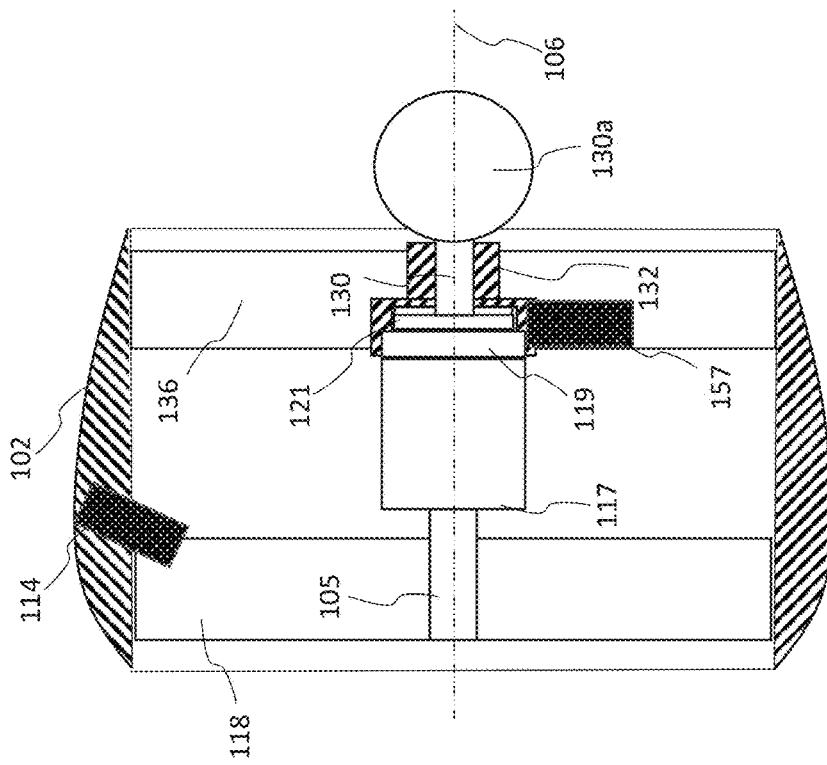
FIG. 9B is a sectional profile view depicting the embodiment of FIG. 9A in the drive wheel configuration.
Figure 9A:
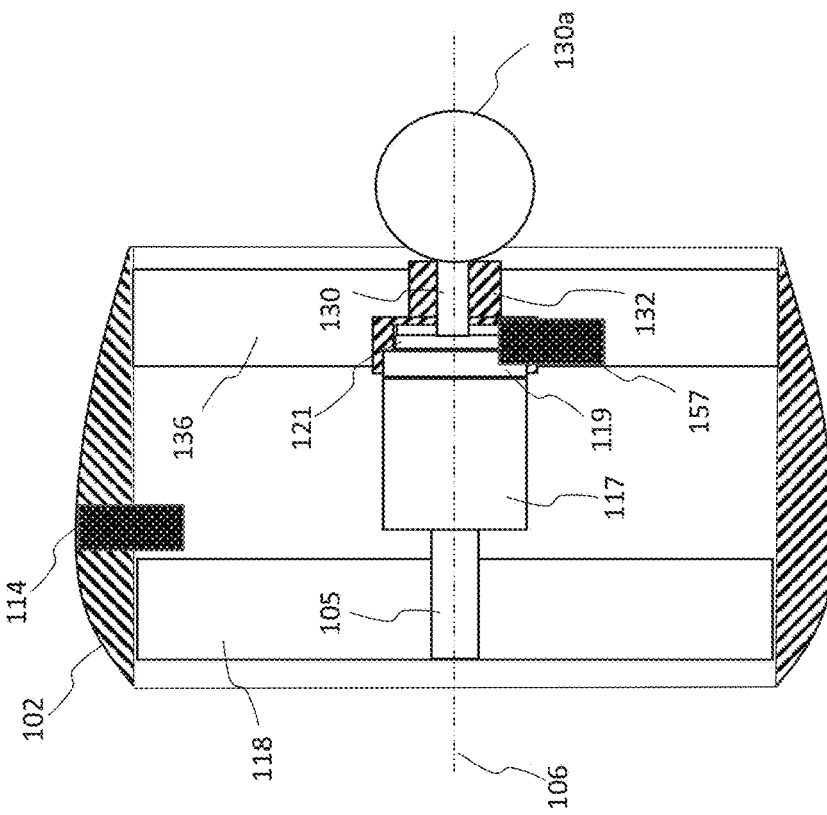
FIG. 9A is a sectional profile view depicting the internal components of an embodiment of the present invention when in the fluid propulsion configuration.

Referring now to FIGS. 9, an embodiment of the convertible engine includes rotatable blade-contacting flanges 114. As shown in FIG. 9A, blade-contacting flanges 114 have a first orientation in which they are not in contact with blades 118. Blade-contacting flanges 114 can be rotated into a second orientation in which blade-contacting flanges 114 are in contact with blades 118. Alternatively, blade-contacting flanges 114 can be translated or telescoped inwardly to bring the blade-contacting flanges into an out of contact with blades 118. In such, embodiments, it is not necessary to translate the mechanical fan in the longitudinal direction. Instead, the blade-contacting flanges are moved. In an embodiment, the blade contacting flanges may be any structural component adapted to engage one or more of the blades, the rotating drive shaft, and/or the rotating body.

FIGS. 9 also provide an exemplary alternative motor mount engagement tab 157 that is adapted to translate in a radial direction to engage motor mount 119 and/or mounting plate 121. An embodiment may also use telescoping tabs 157 designed to extend inwardly from the shroud to engage motor mount 119 and/or mounting plate 121. Motor mount 119 and/or mounting plate 121 include slots or other features for receiving tabs 157 thereby preventing rotation of motor mount 119 and/or mounting plate 121 with respect to shroud 102.

Motor mount engagement tabs 157 can be translated between an engaged orientation shown in FIG. 9A and a disengaged orientation shown in FIG. 9B. The translation of tabs 157 is achieved using any linear drive mechanism known to a person of ordinary skill in the art, including but not limited to mechanical gears, motors, and electromagnetic mechanisms.

As most clearly shown in FIG. 9A, mechanical fan 116 can freely rotate about longitudinal axis 106 when blade-contacting flange(s) 114 do not contact blades 118. In addition, motor mount engagement tab(s) 157 engages motor mount 119 to prevent rotation of shroud 102 with respect to motor mount 119. As most clearly shown in FIG. 9B, when blade-contacting flange(s) 114 contact blades 118 and motor mount engagement tab(s) 157 disengages motor mount 119, shroud 102 concurrently rotates with mechanical fan 116. In other words, the engine is adapted to operate in a typical propulsion mode (FIG. 9A) or in a drive-wheel mode (FIG. 9B).

An embodiment may use any methods known to a person of ordinary skill in the art to convert the engine between (1) a propulsion configuration during which the mechanical fan rotates with respect to the shroud and (2) a drive-wheel configuration during which the shroud rotates. Achieving this functionality may accomplished through any singular or combined operation of mechanical (e.g. stops), electro-mechanical (e.g. actuated latches) or electrical (e.g. electromagnetic clutches or couplers) devices that facilitate both (1) the rotation of the shroud relative to the vehicle axle/body in the drive wheel configuration, and (2) the rotation of the fan relative to a stationary shroud in the fluid propulsion configuration.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A ducted fan engine, comprising:
   a mechanical fan in communication with a motor, the motor configured to cause the fan to rotate about a rotational axis, the mechanical fan having a plurality of blades concentrically arranged about the rotational axis;

a shroud concentrically aligned with the mechanical fan about the rotational axis;
a fluid-propulsion configuration in which the mechanical fan independently rotates with respect to the shroud to produce thrust through fluid flow; and
a drive-wheel configuration in which the motor causes rotation of the shroud about the rotational axis.

2. The ducted fan engine of claim 1, wherein the drive-wheel configuration includes at least one of the blades in the plurality of blades in direct or indirect mechanical communication with the shroud.

3. The ducted fan engine of claim 1, wherein the motor further includes:
a motor mount, a rotational body, and a drive shaft;
the rotational body is rotationally secured to the motor mount, such that the rotational body can rotate relative to the motor mount;
the drive shaft is secured to the rotational body and the mechanical fan, thereby enabling the rotational body, drive shaft, and mechanical fan to rotate simultaneously.

4. The ducted fan engine of claim 3, wherein the drive-wheel configuration includes the shroud mechanically or electromagnetically engaged with at least the rotational body or the drive shaft, such that the shroud rotates simultaneously with the mechanical fan.

5. The ducted fan engine of claim 3, further including:
the motor mount fixedly secured in a non-rotational manner to a mounting arm;
the mounting arm extending through a collar attached to the shroud, the mounting arm adapted to translate within the collar in a direction parallel to the rotational axis;
the motor mount shaped to engage the collar when the mounting arm pulls the motor mount into contact with the collar, thereby preventing rotation of the shroud with respect to the motor mount;
whereby translating the motor mount out of engagement with the collar allows the shroud to rotate with respect to the motor mount in the drive-wheel configuration.

6. The ducted fan engine of claim 5, further including a member extending inwardly from the shroud to contact at least the mechanical fan, drive shaft, or rotating body when the ducted fan engine is in the drive-wheel configuration.

7. The ducted fan engine of claim 1, further including a blade-contacting flange disposed on an internal surface of the shroud and extending a distance inwardly towards the rotational axis, the distance being greater than the difference between an outer diameter of the mechanical fan and an inner diameter of the shroud.

8. The ducted fan engine of claim 1, further including a tread disposed on an outer surface of the shroud, thereby providing traction between a shroud-contacting surface and the shroud when the ducted fan engine operates in the drive-wheel configuration.

9. A ducted fan engine, comprising:
a mechanical fan in communication with a motor via a drive shaft extending between the mechanical fan and the motor, the motor configured to rotate the drive shaft and fan about a rotational axis, wherein the mechanical fan has a plurality of blades concentrically arranged about the rotational axis;
a shroud concentrically aligned with the mechanical fan about the rotational axis;
a fluid-propulsion configuration in which the mechanical fan independently rotates with respect to the shroud to produce thrust through fluid flow; and
a drive-wheel configuration in which the shroud is mechanically or electromagnetically engaged with at least the mechanical fan, a rotational body of the motor, or the drive shaft, such that the shroud rotates simultaneously with the mechanical fan.

10. The ducted fan engine of claim 9, wherein the motor further includes the rotational body rotationally secured to a motor mount, such that the rotational body can rotate relative to the motor mount and the motor mount secured to a mounting arm.

11. The ducted fan engine of claim 10, further including:
the mounting arm extending through a collar attached to the shroud, the mounting arm adapted to translate within the collar in a direction parallel to the rotational axis;
the motor mount shaped to engage the collar when the mounting arm pulls the motor mount into contact with the collar, thereby preventing rotation of the shroud with respect to the motor mount;
whereby translating the motor mount out of engagement with the collar allows the shroud to rotate with respect to the motor mount in the drive-wheel configuration.

12. The ducted fan engine of claim 9, further including a member extending inwardly from the shroud to contact at least the mechanical fan, drive shaft, or rotating body when the ducted fan engine is in the drive-wheel configuration.

13. The ducted fan engine of claim 9, further including a blade-contacting flange disposed on an internal surface of the shroud and extending a distance inwardly towards the rotational axis, the distance being greater than the difference between an outer diameter of the mechanical fan and an inner diameter of the shroud.

14. The ducted fan engine of claim 9, further including a tread disposed on an outer surface of the shroud, thereby providing traction between a shroud-contacting surface and the shroud when the ducted fan engine operates in the drive-wheel configuration.

15. A ducted fan engine, comprising:
a mechanical fan in communication with a motor via a drive shaft extending between the mechanical fan and the motor, the motor configured to rotate the drive shaft and fan about a rotational axis, wherein the mechanical fan has a plurality of blades concentrically arranged about the rotational axis;
a shroud concentrically aligned with the mechanical fan about the rotational axis, the shroud in mechanical communication with a concentrically aligned collar, wherein the collar is in mechanical communication with at least a portion of the motor;
a fluid-propulsion configuration in which the mechanical fan independently rotates with respect to the shroud to produce thrust through fluid flow; and
a drive-wheel configuration in which the shroud is mechanically or electromagnetically engaged with at least the mechanical fan, a rotational body of the motor, or the drive shaft, such that the shroud rotates simultaneously with the mechanical fan.

16. The ducted fan engine of claim 15, wherein the motor further includes the rotational body rotationally secured to a motor mount, such that the rotational body can rotate relative to the motor mount and the motor mount secured to a mounting arm.

17. The ducted fan engine of claim 16, further including:
the mounting arm extending through the collar, the mounting arm adapted to translate within the collar in a direction parallel to the rotational axis;

the motor mount shaped to engage the collar when the mounting arm pulls the motor mount into contact with the collar, thereby preventing rotation of the shroud with respect to the motor mount;

whereby translating the motor mount out of engagement with the collar allows the shroud to rotate with respect to the motor mount in the drive-wheel configuration.

18. The ducted fan engine of claim 15, further including a member extending inwardly from the shroud to contact at least the mechanical fan, drive shaft, or rotating body when the ducted fan engine is in the drive-wheel configuration.

19. The ducted fan engine of claim 15, further including a blade-contacting flange disposed on an internal surface of the shroud and extending a distance inwardly towards the rotational axis, the distance being greater than the difference between an outer diameter of the mechanical fan and an inner diameter of the shroud.

20. The ducted fan engine of claim 15, further including a tread disposed on an outer surface of the shroud, thereby providing traction between a shroud-contacting surface and the shroud when the ducted fan engine operates in the drive-wheel configuration.

\* \* \* \* \*